April 8, 1924.
G. E. MILLER
1,489,269
GRAIN BLOWER
Filed Sept. 15, 1922
2 Sheets-Sheet 1
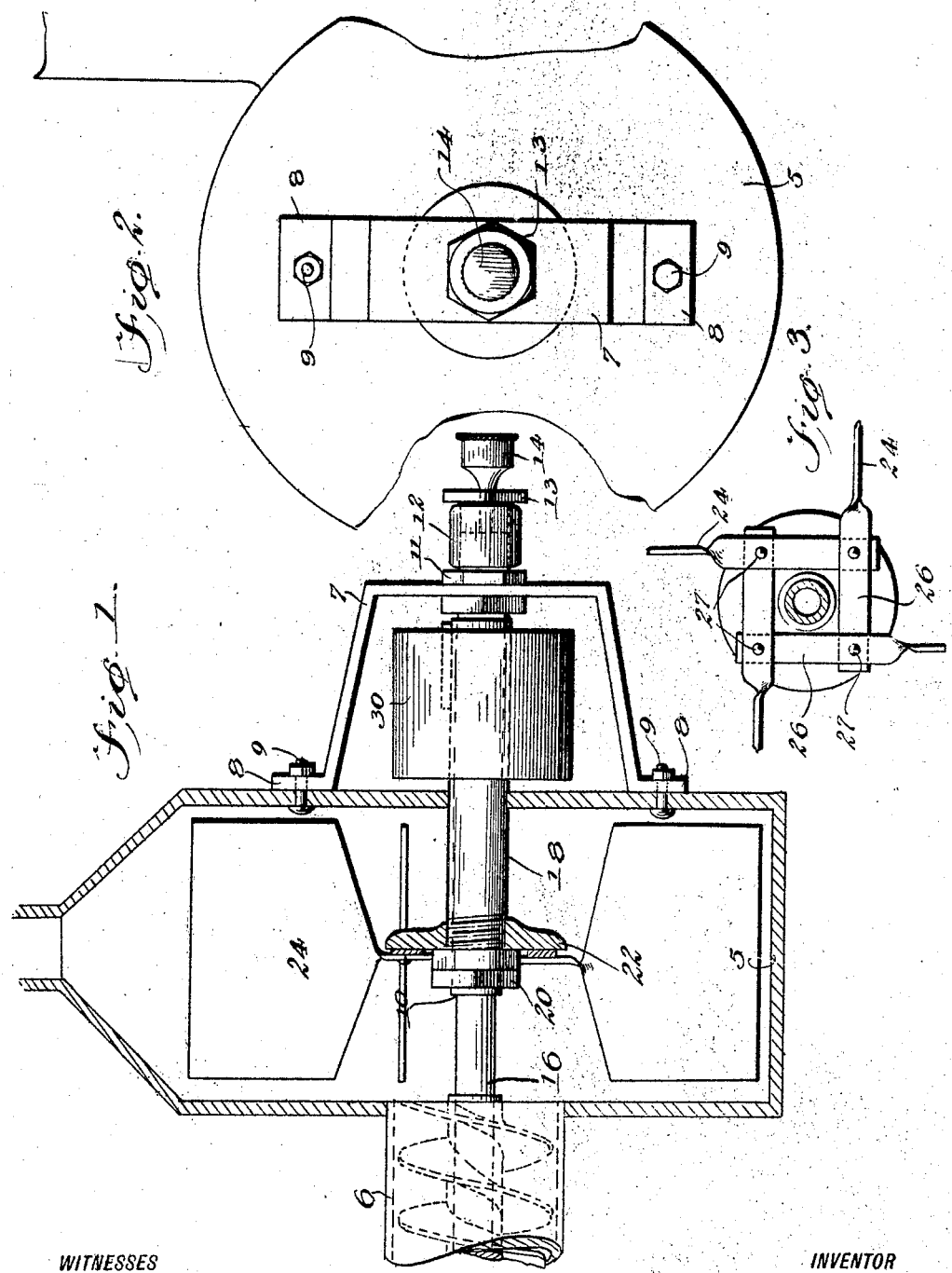
WITNESSES
INVENTOR
G. E. Miller,
BY
ATTORNEYS

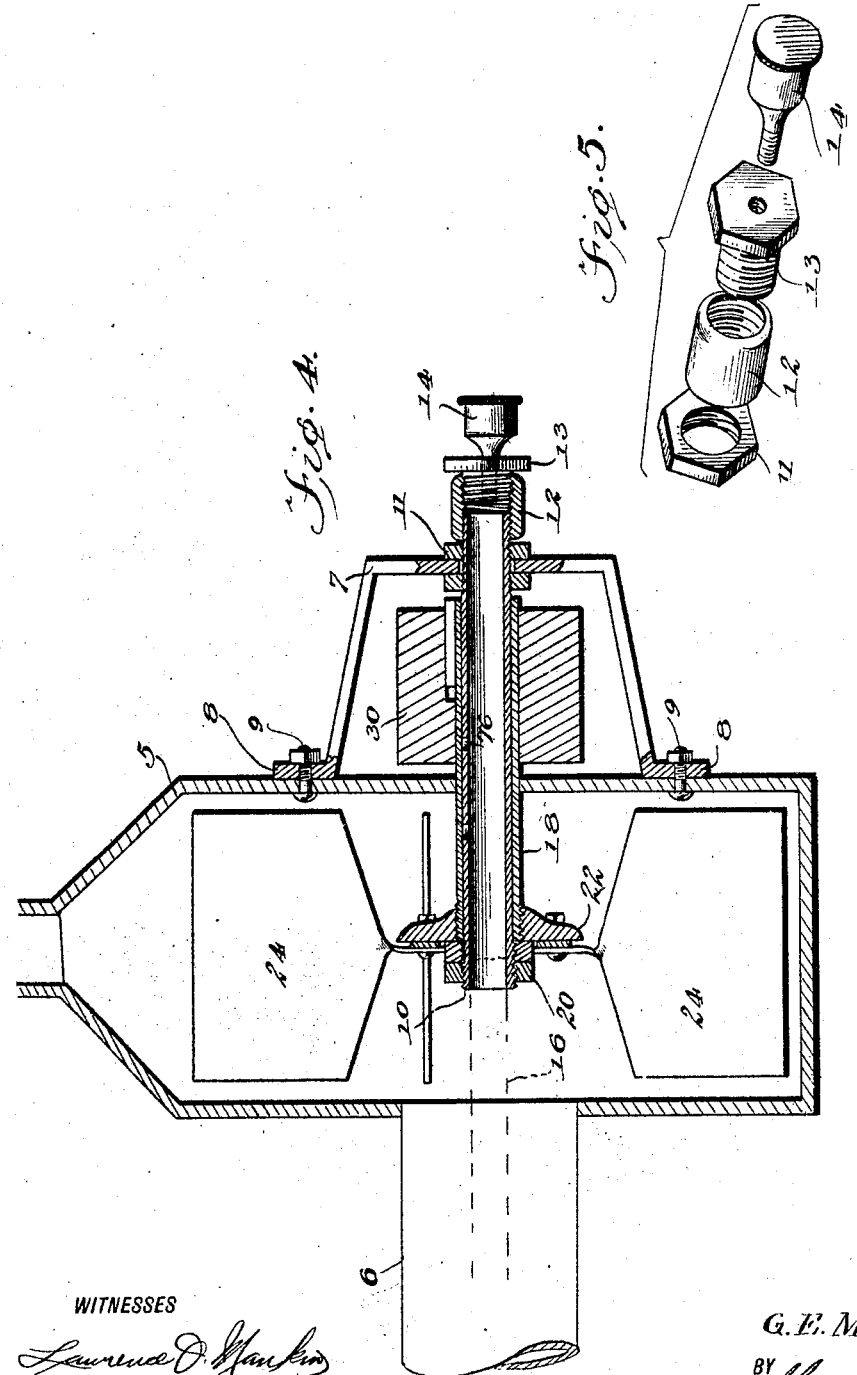

Patented Apr. 8, 1924.

1,489,269

UNITED STATES PATENT OFFICE.

GUSTAF E. MILLER, OF STRATTON, NEBRASKA.

GRAIN BLOWER.

Application filed September 15, 1922. Serial No. 588,507.

*To all whom it may concern:*

Be it known that I, GUSTAF E. MILLER, a citizen of the United States, and resident of Stratton, in the county of Hitchcock and State of Nebraska, have invented certain new and useful Improvements in Grain Blowers, of which the following is a specification.

This invention relates to blowers especially adapted for use in connection with thrashing machines, harvester thrashers, corn shellers, etc., and is designed to displace the endless conveyor and other methods now commonly employed for elevating grain.

Briefly stated an important object of this invention is to provide a blower which may be readily and conveniently applied and constructed from materials which are easily obtainable, so that any necessary repairs may be quickly made.

A further object is to provide a grain elevating means which has but few parts, is of highly simplified construction and cheap to manufacture.

Other objects and advantages of the invention will be apparent during the course of the following description.

In the accompanying drawing, forming a part of this application and in which like numerals are employed to designate like parts throughout the same, Figure 1 is a side elevation of the blower applied, the casing being in section, Figure 2 is a fragmentary end view, Figure 3 is a detail transverse sectional view, Figure 4 is a vertical section through the blower, and Figure 5 is a group perspective illustrating the lubricator and the attaching means therefor.

In the drawing wherein for the purpose of illustration is shown a preferred embodiment of the invention, the numeral 5 designates a housing or drum into which the improved blower extends and as illustrated in Figure 1 it will be observed that the drum 5 is arranged at one end of the auger casing 6. However, the drum may be arranged at any other suitable part of the machine without departing from the spirit of the invention.

In carrying out the invention I provide a U-shaped bracket 7 having its terminal portions formed with attaching lugs 8 secured flatly in contact with the drum in a vertical or horizontal position by means of fastening bolts 9. Of course the arrangement and position of the bracket 7 depends upon the location and arrangement of the adjacent parts of the machine and it may be necessary to secure the bracket either in a vertical or horizontal or inclined position.

The bracket which is of U-shaped formation has its bight portion formed with an opening to snugly receive an inner bearing member 10 of tubular formation and a pair of lock nuts 11 are threaded on the inner bearing member on opposite sides of the bight portion and securely engage the same whereby to hold the bearing in a set position.

The outer lock nut 11 is held in position by means of a coupling member or collar 12 threaded on the inner bearing and as illustrated in the drawings a reducing member 13 is threaded into the collar and is provided with a centrally arranged threaded opening for the reception of a grease cup or lubricator 14. It will be seen that on operating the lubricator 14 grease will be supplied to the inner terminal member 10 for lubricating the various parts of the blower.

It will be seen that the auger shaft 16 may be rotatably extended into the inner bearing member 10 and as the bearing member 10 is securely supported by the bracket 7 there is no necessity of providing additional bracing means. Attention is directed to the fact that the member 10 is a bearing inside and out and consequently no additional end bearing for the auger shaft is needed. However the improved blower may be employed where no auger is used.

In carrying out the invention the outer sleeve bearing 18 is rotatably mounted on the inner bearing and is held against extensive longitudinal movement through the medium of lock nuts 20 threaded on the inner bearing member and the inner lock nut 11 cooperates with the lock nuts 20 in holding the outer bearing member in position.

The inner end of the sleeve bearing is exteriorly threaded for engagement with an annular flange 22 to which a plurality of blower blades 24 are connected. Fig. 3 illustrates that the inner portions of the blades 24 are provided with attaching arms 26 each of which is formed with a pair of openings for the reception of fastening devices 27 by means of which the arms are securely attached to the flange. It will be seen that the inner portion of each arm is confined beneath the intermediate portion of the arm extending at right angles thereto and a fastening device 27 is extended through the overlapping portion of the arm whereby to reduce the number of openings in the flange to a minimum.

The construction illustrated in Figure 3 comprises an extremely durable and simple device and the blades cannot break or bend as the result of ordinary strains. The particular means for securing the arms 26 to the flange permits the arms to be readily disconnected when desired. It is understood of course that arms of various sizes may be employed according to the requirements.

The blower is operated by a belt or other power transmitting means trained about a pulley 30 keyed on the outer bearing member 18 between the blower drum and the bight portion of the bracket. The belt trained about the pulley 30 may extend from a suitable source of power and when the power is turned on the blower will operate.

The improved grain elevator blower is especially adapted for use on machinery such as thrashing machines for elevating the grain into wagons or when self weighers are used to elevate the grain into the self weigher and then the grain is run into a wagon or the like.

On a combined harvester-thresher they can be used to elevate the grain into a wagon or where a hopper or box is placed on the combine for the purpose of carrying a load of wheat the blower can be used to an advantage in elevating the grain into this hopper.

The blower can be used to an advantage at the bin to elevate the grain into it from a dump or hopper into which the grain has been dumped from a wagon, thereby eliminating the labor necessary to scoop the wheat into the bin.

On a machine the power to drive the blower can be taken from any source without departing from the spirit of the invention.

In carrying out the invention the bearing member 10 is provided with one or more holes or apertures 76 to permit part of the oil forced into the bearing member to lubricate the outer member or sleeve 18. The oil supplied by the lubricator 14 also oils that end of the auger shaft which is extended into the bearing member 10. Of course the openings 76 may be placed at any point in the bearing member 10, preferably near the middle.

It will be observed that the tubular sleeve 18 which carries the pulley, and also the fan, permits the strain or pull of the belt to come directly over the bearing instead of on one side of a boxing or bearing, which is commonly used and which causes a side strain or pull, both of which are undesirable. Also the pulley being directly over the bearing takes up less space and makes the blower narrow and more compact.

It is to be understood that the form of the invention illustrated and described is to be taken as the preferred example of the same, and that such minor changes in arrangement and construction as will suggest themselves may be made, provided they remain within the spirit of the invention and the scope of what is claimed.

Having thus described the invention, what is claimed is:—

1. An attachment of the character specified comprising inner and outer tubular members, a drum partially receiving the inner and outer tubular members and having one wall in engagement therewith whereby to brace the tubular members, a U-shaped bracket secured to said drum and receiving said tubular members, means on the inner tubular member to hold the outer tubular member against excessive longitudinal movement, and a plurality of blades having connection with the outer tubular member and being rotated thereby.

2. An attachment of the character specified, comprising inner and outer tubular members, a drum receiving said inner and outer tubular members, a flange secured on said outer tubular member, and blades having their inner terminal portions formed with attaching arms overlapping each other and secured to the flange.

3. An attachment of the character specified, comprising inner and outer tubular members, a drum receiving said inner and outer tubular members, a flange secured on said outer tubular member, blades having their inner terminal portions formed with attaching arms overlapping each other and secured to the flange, and nuts threaded on an inner tubular member and holding the outer tubular member against excessive longitudinal movement.

4. An attachment of the character specified, comprising inner and outer tubular members, a drum receiving said inner and outer tubular members, a flange secured on said outer tubular member, blades having their inner terminal portions formed with attaching arms overlapping each other and secured to the flange, nuts threaded on an inner tubular member and holding the outer tubular member against excessive longitudinal movement, a U-shaped bracket having a bight portion receiving said inner tubular member, and a lubricator connected to the inner tubular member.

5. An attachment of the character specified, comprising inner and outer tubular members, a drum receiving said inner and outer tubular members, a flange secured on said outer tubular member, blades having their inner terminal portions formed with attaching arms overlapping each other and secured to the flange, nuts threaded on an inner tubular member and holding the outer tubular member against excessive longitudinal movement, a U-shaped bracket having a bight portion receiving said inner tubular member, a lubricator connected to the inner tubular member, the inner terminal portions of the inner tubular member being adapted to receive the shaft of an auger.

GUSTAF E. MILLER.